United States Patent

Ishida et al.

[11] Patent Number: 6,144,296
[45] Date of Patent: Nov. 7, 2000

[54] VEHICLE MONITORING SYSTEM

[75] Inventors: Tetsuya Ishida, Saitama-ken; Wataru Ishibashi, Shizuoka-ken, both of Japan

[73] Assignees: Yazaki Corporation, Tokyo; Nissan Diesel Motor Co., Ltd., Saitama-ken, both of Japan

[21] Appl. No.: 09/265,388

[22] Filed: Mar. 10, 1999

[51] Int. Cl.$^7$ ...................................................... B60Q 1/00
[52] U.S. Cl. ............................ 340/461; 340/937; 701/35
[58] Field of Search ..................................... 340/461, 937, 340/541, 426, 425.5; 701/29, 30, 35

[56] References Cited

U.S. PATENT DOCUMENTS 5,815,093   9/1998   Kikinis ..................................... 340/937

FOREIGN PATENT DOCUMENTS 6-74499   10/1994   Japan .
8-292718  11/1996   Japan .

*Primary Examiner*—Daryl Pope
*Attorney, Agent, or Firm*—Finnegan, Henderson, Farabow, Garrett & Dunner, L.L.P.

[57] ABSTRACT

A vehicle monitoring system is provided. Based on operation contents on a remote control unit, an engine speed, a vehicle speed, a REV signal representing a gear shifting lever in the reverse position, a PKB signal representing a parking lever in the activated condition, a VICS signal outputted from a VICS receiving apparatus, etc., the system selects the most suitable video signal or display contents out of respective image signals generated from a TV tuner unit, a video unit and a navigation system, an image signal outputted from a rear camera unit, display contents expressing the abnormality on the vehicle and display contents of the VICS signal. After selecting the most suitable video signal or display contents, the system displays it on a TV monitoring unit.

21 Claims, 4 Drawing Sheets

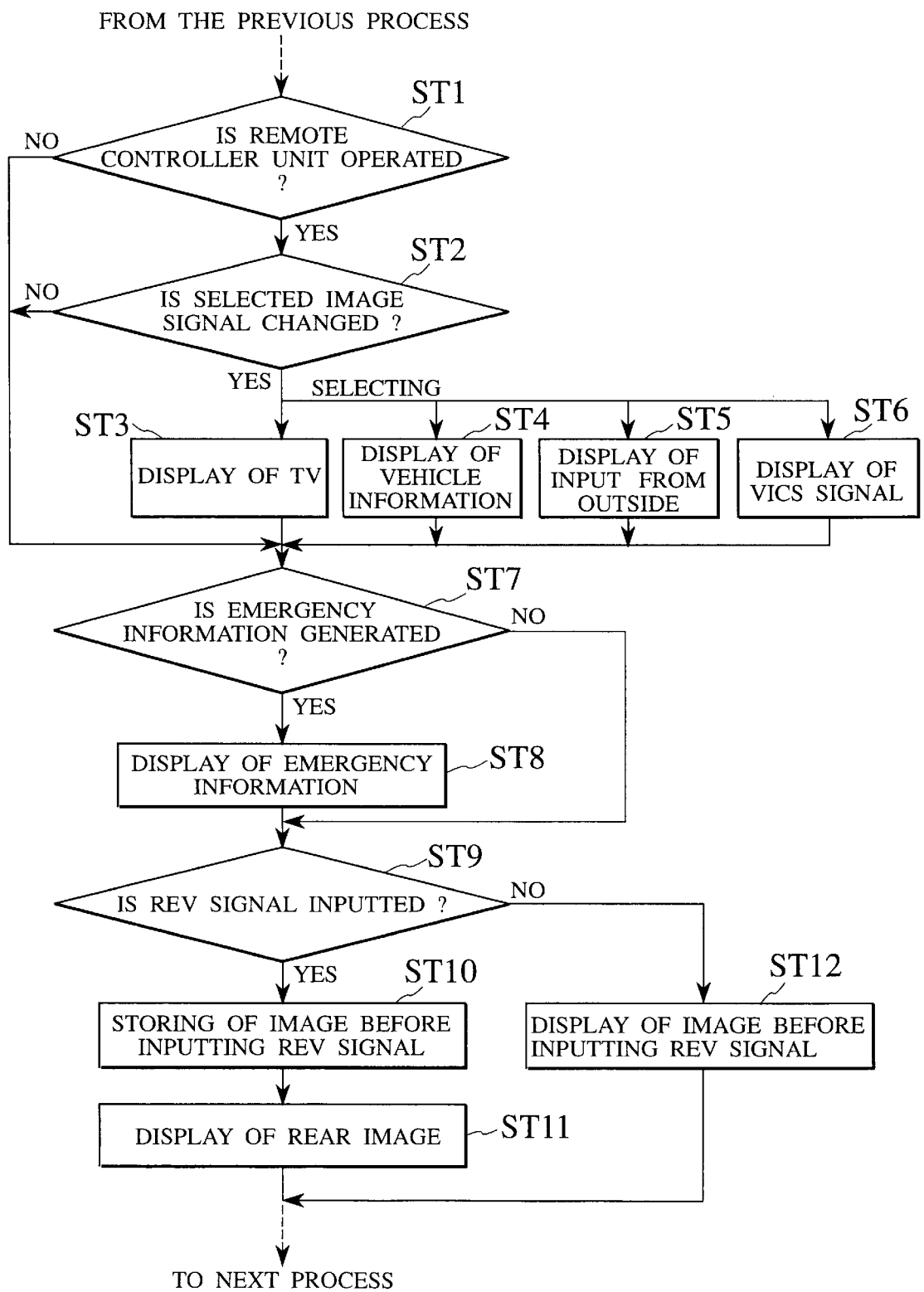

VEHICLE MONITORING SYSTEM

BACKGROUND OF THE INVENTION

1. Field of the Invention

The present invention relates to a vehicle monitoring system which selectively displays an appropriate image signal out of a plurality of image signals in accordance with the vehicle's condition, the operating condition of various switches and so on.

2. Description of the Related Art

As the vehicle monitoring system which is capable of selectively displaying a number of images on a monitoring unit on the vehicle, there are known a displaying apparatus of Japanese Unexamined Patent Publication (kokai) No. 8-292718 on one hand, and a television apparatus having a backward monitoring function of Japanese Unexamined Utility Model Publication (kokai) No. 6-74499 on the other hand.

FIG. 1 shows the former displaying apparatus disclosed in Japanese Unexamined Patent Publication (kokai) No. 8-292718. In the shown apparatus 101, a GPS (global positioning system) unit detecting part 102 detects whether a monitor 103 is installed on a vehicle or not. On condition that the monitor 103 is installed in a position visible to a driver and when the vehicle's traveling is detected by a parking brake detecting part 104, a CPU 105 allows the monitor 103 so as not to display TV (television) video signal generated from a TV tuner 106. On the other hand, the CPU 105 allows the monitor 103 to display the geographic information loaded from a CD (compact disc) ROM 108 set in a CD driving part 107, such as a CD player, the present positional information obtained by a GPS part 109, etc. in order to ensure the driver's safety during the vehicle's traveling.

While, if it is detected that the monitor 103 is installed in a position invisible to the driver, by the GPS unit detecting part 102, the CPU 105 withdraws the prohibition against the monitor's displaying, so that the TV video signal produced from the TV tuner 106 is displayed on the monitor 103 in spite of vehicle's traveling. That is, depending on the position of the monitor 103 installed, it may be carried out to automatically withdraw the "safety" countermeasure where the monitor 103 is prohibited from displaying any image but a driving map during the vehicle's traveling. In other words, the above-mentioned apparatus is adapted so as to permit the monitor 103 to display the images besides the driving map only when the safety for the driver is ensured.

However, the so-constructed displaying apparatus 101 has a problem as follows. That is, in the apparatus 101, the GPS unit detecting part 102 does detect the installed condition of the monitor 103, while the parking brake detecting part 104 detects whether the vehicle is at a standstill. On the basis of these detection results, the apparatus 101 does restrict the sorts of images capable of being displayed by the monitor. Therefore, when carrying out the selecting of images employing other detection results except for the above-mentioned detection results, for example a position of gear (transmission), an engine rotating speed, or the like, the whole system has to be reconstructed newly.

Thus, there is a problem that the above-mentioned displaying apparatus 101 cannot be used as a so-called "backward monitoring system" which is usable when the vehicle travels in a backward direction.

FIG. 2 shows the latter television apparatus equipped with the backward monitoring function, disclosed in Japanese Unexamined Utility Model Publication (kokai) No. 6-74499. In the shown apparatus 111, when a gear shifting lever occupies other positions besides the backward position while a switch 112 is at an OFF position, the broadcasting signal received by an antenna 113 is fed to a television receiver 114 to display the contents of TV broadcasting.

On the other hand, when the gear shifting lever occupies the backward position and the switch 112 is at an ON position, a power source is supplied to a TV camera 115 for backward monitoring installed in a rear spoiler of the vehicle, so that a video signal of the rear view of the vehicle is introduced to the television receiver 114 to display the rear image. Thus, the television receiver 114, which outputs TV programs when switch 112 is in the OFF position is used as a backward monitoring device for displaying the rear view of the vehicle when switch 112 is at the ON position.

However, the so-constructed television apparatus 111 has a fundamental problem that unless the apparatus is provided with the TV camera 115 for picking up the rear view, no image could be displayed on the television receiver 114.

Additionally, the above-mentioned displaying apparatus 101 and the television apparatus 111 have the following common problem. That is, since it is executed to display the specified picture on the monitor 103 or the TV receiver 114 while prohibiting to display the other pictures on the basis of judgment whether the parking brake is in the activated condition in the displaying apparatus 101 or whether the gear shifting lever occupies the backward position in the television apparatus 111, it is impossible to display an emergency picture expressing the contents of abnormal condition in case that the vehicle is brought into the abnormal condition.

SUMMARY OF THE INVENTION

It is therefore an object of the present invention to provide a vehicle monitoring system which is capable of automatically selecting a suitable image out of a plurality of images, in accordance with contents of inputted operation inputted from a remote control unit etc. and the vehicle's condition and which subsequently allows a monitoring unit to display the selected image thereon, whereby the working efficiency of the expensive monitoring unit can be improved remarkably.

The object of the present invention described above can be accomplished by a vehicle monitoring system for a vehicle, comprising:

at least one sensor attached to a part of the vehicle, for detecting a driving condition of the vehicle;

a monitoring unit mounted on the vehicle, for displaying information about the vehicle;

a display determining section for determining what kind of picture should be displayed, in accordance with contents of inputted operation and the driving condition detected by the sensor; and a display processing section for selecting one or more video signals out of a plurality of inputted video signals, in accordance with the determination result by the display determining section, the display processing section subsequently producing a display signal corresponding to the selected one or more video signals with or without image-processing thereof and thereafter, thereby allowing the monitoring unit to display the contents of the display signal.

In operation, the display determining section determines what kind of picture should be displayed, on the basis of the contents of inputted operation and the contents of the detection signal outputted from the sensor disposed in the vehicle, namely, the driving condition of the vehicle. Based on the result determined by the display determining section, the display processing section selects one or more video signals out of a plurality of inputted video signals. Thereafter, the display processing section produces the display signal corresponding to the selected video signal(s) and subsequently allows the monitoring unit to display the contents'of the display signal thereon. In this way, the vehicle monitoring system of the invention automatically selects the suitable image out of the plural images, in accordance with the contents of inputted operation inputted from the remote control unit etc. and the vehicle's condition and subsequently allows the monitoring unit to display the selected image. Consequently, the working efficiency of the expensive monitoring unit can be improved remarkably.

In the above-mentioned vehicle monitoring system, it is preferable that in case of inputting an emergency information, the display determining section gives the emergency information priority over any other video signals and the display processing section allows the monitoring unit to display the contents of the emergency information thereon.

In this way, when an unusual matter is caused on the vehicle or when the emergency information is inputted from the traffic information system etc., then the emergency information is displayed on the monitoring unit although the other video signals has been displayed, so that the driving safety can be improved remarkably.

In the above-mentioned vehicle monitoring system, it is also preferable that in case of the vehicle's going back, the display determining section checks whether or not a rear video signal representing a rear view of the vehicle is being inputted. When the rear video signal is inputted, the display determining section determines the rear video signal as an object being displayed. On the contrary, when the rear video signal is not inputted, the display determining section determines the one or more video signals originally inputted, as the object being displayed.

With the above-mentioned operation, even if the vehicle having no TV camera unit for picking up the rear view goes back, the picture on the monitoring unit does not appear. Consequently, the vehicle monitoring system can be improved in terms of the applicability.

In the present invention, preferably, the operation is carried out by using a remote control unit installed on the vehicle.

In the present invention, preferably, the driving condition detected by the sensor is the vehicle's speed.

In the present invention, preferably, the driving condition is represented by a REV signal, which indicates that a gear shifting lever occupies a reverse position for allowing the vehicle to go back.

In the present invention, preferably, the driving condition is represented by a PKB signal, which indicates that a parking brake of the vehicle is activated.

In the present invention, preferably, the vehicle monitoring system further comprises a VICS (vehicle information and communication system) receiving apparatus and the display determining section determines what kind of picture should be displayed, in accordance with the contents of inputted operation, the driving condition detected by the sensor and a VICS signal from the VICS receiving apparatus.

These and other objects and features of the present invention will become more fully apparent from the following description and appended claims taken in conjunction with the accompany drawing.

BRIEF DESCRIPTION OF THE DRAWINGS

FIG. 4 is a flow chart showing an operation of the vehicle monitoring system in accordance with a second embodiment of the present invention.

DESCRIPTION OF THE PREFERRED EMBODIMENT

Embodiments of the present invention will be described with reference to the drawings.

1st. Embodiment

Figure 1:
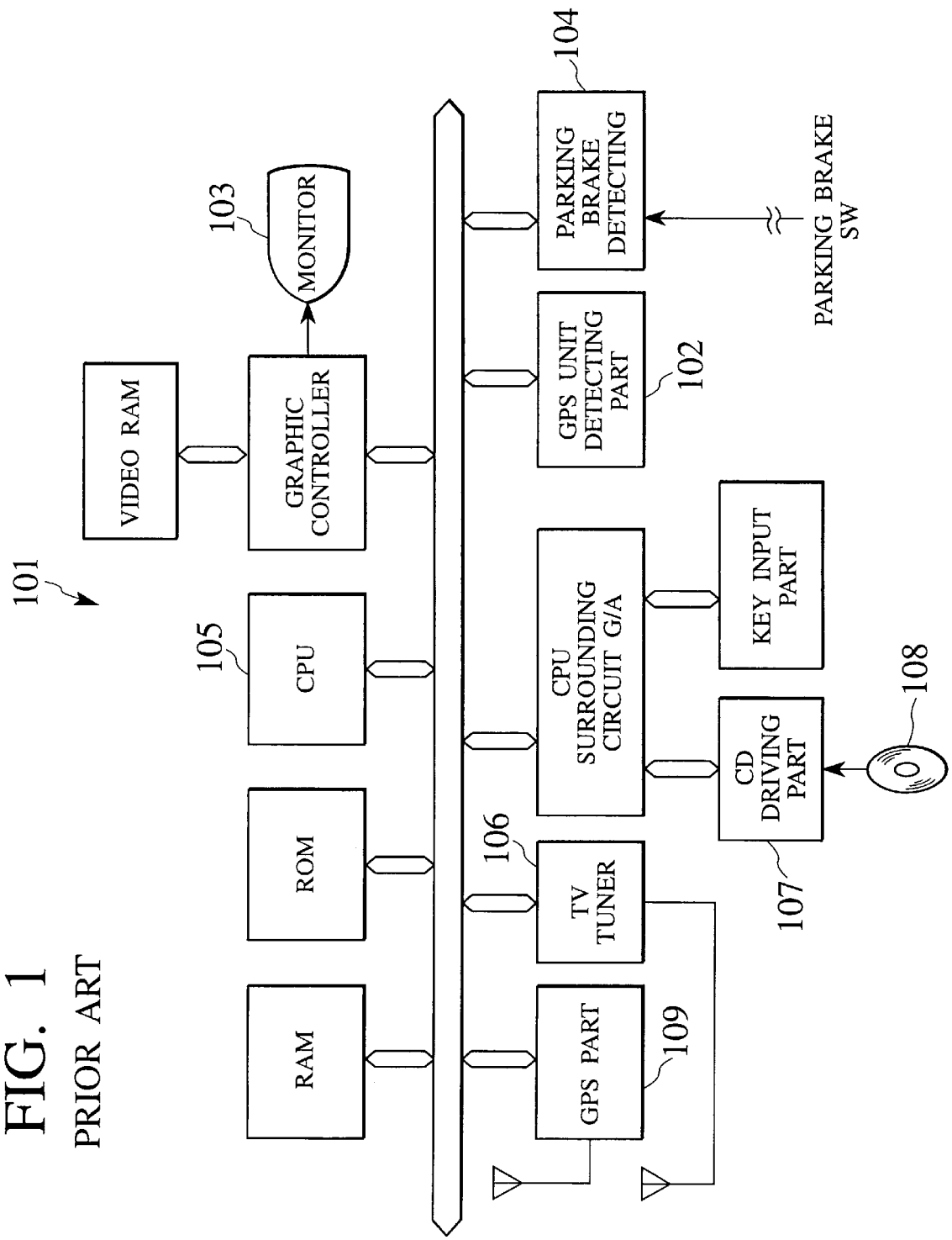
FIG. 1 is a block diagram showing a constitution of the related art displaying apparatus shown in Japanese Unexamined Patent Publication (kokai) No. 8-292718.
Figure 2:
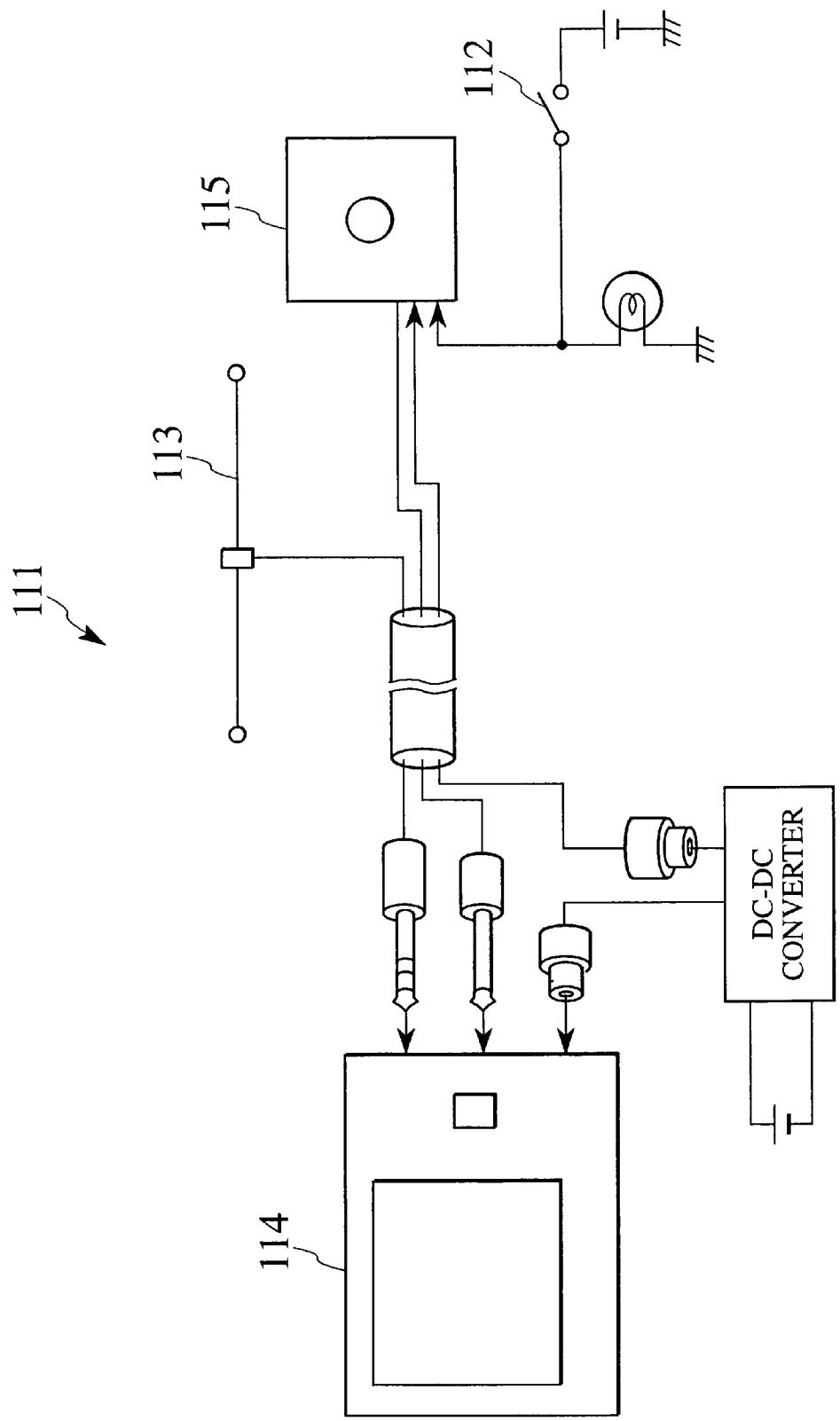
FIG. 2 is a block diagram showing a constitution of the related art television apparatus having the backward monitoring function, shown in Japanese Unexamined Utility Model Publication (kokai) No. 6-74499.
Figure 3:
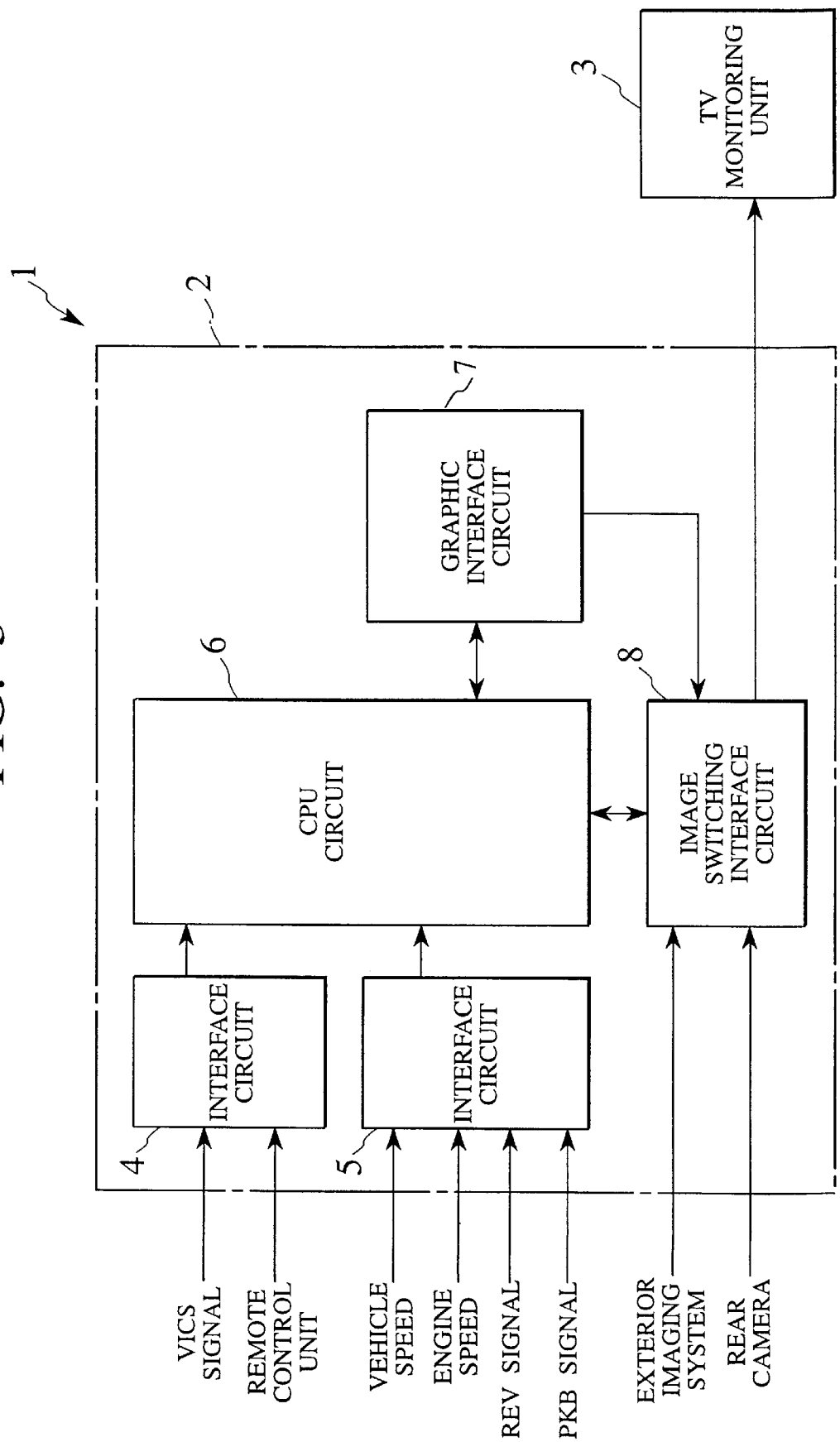
FIG. 3 is a block diagram showing a constitution of the vehicle monitoring system in accordance with a first embodiment of the present invention.

FIG. 3 is a block diagram showing a vehicle monitoring system 1 in accordance with the first embodiment of the present invention.

The vehicle monitoring system 1 in the figure includes a main control unit 2 and a TV monitoring unit 3.

Based on a variety of command signals from a remote control unit (not shown) provided for the vehicle, respective detection signals outputted from various sensors (not shown) disposed in various parts of the vehicle, a VICS (vehicle information and communication system) signal outputted from a VICS receiving apparatus (also not shown), etc., the main control unit 2 selects any one of video signals and display contents and produces the display signal corresponding to the selected one. Note, in the embodiment, the video signals consist of, for example, respective video signals from a not-shown TV tuner unit, a video unit (also not shown), a navigation system (also not shown) on the vehicle device, etc. (exterior video signals) and also a video signal outputted from a rear camera unit on the vehicle. Similarly, the above display contents consist of display contents representing that the vehicle has an abnormal event, display contents transmitted by the above VICS signal, etc.

The TV monitoring unit 3 is arranged on the side of a driver's seat in the vehicle and does input the display signal produced by the main control unit 2 in order to display the contents of the display signal.

Repeatedly, on the basis of the contents of inputted operation inputted by means of the remote control unit, a vehicle speed, an engine speed, a REV signal representing the gear shifting lever in the backward (reverse) position, a PKB signal representing the parking brake in the activated condition, the VICS signal from the VICS receiving apparatus, etc., the vehicle monitoring system 1 of the embodiment operates to select the most suitable image signal (or the most suitable display contents) out of the video signals from the TV tuner unit, the video unit, the navigation system, etc., the video signal outputted from the rear camera unit, the display contents expressing the abnormality of the vehicle, the display contents of the above VICS signal outputted from the VICS receiving apparatus, etc. Furthermore, the system 1 allows the TV monitoring unit 3 to display the so-selected most suitable image signal (or the display contents) thereon.

As shown in FIG. 3, the main control unit 2 of the embodiment is constituted by a first interface circuit 4, a second interface circuit 5, a CPU (central processing unit) circuit 6, a graphic interface circuit 7 and an image switching interface circuit 8.

The first interface circuit 4 does input the command signals outputted from the remote control unit and the VICS signal outputted from the VICS receiving apparatus and produces the data of remote control commands, the data of VICS commands and the VICS information.

Similarly, the second interface circuit 5 inputs the vehicle speed signal, the engine speed signal, the REV signal and the PKB signal, all of which are outputted from the various sensors disposed in the respective parts of the vehicle, and produces the data of vehicle speed, the data of engine speed, the REV data and the PKB data, respectively.

The CPU circuit 6 does input the various data, i.e. the data of remotee control commands, the data of VICS commands, the VICS information, the vehicle speed data, the engine speed data, the REV data, and the PKB data, all of which are provided via. the first and second interface circuits 4 and 5. On input of the above data, the CPU circuit 6 further executes a process to determine the most suitable display command contents out of the display command contents designated by the driver and the display command contents corresponding to the present vehicle condition and subsequently generate the display command signals corresponding to the so-determined display command contents.

Additionally, the CPU circuit 6 also carries out a process to produce the image data required for displaying the contents of abnormality occurred to the vehicle and the image data required for displaying the contents of the above VICS information.

The graphic interface circuit 7 inputs the image data (image data showing the contents of the VICS information; image data showing the contents of abnormalities in the vehicle) generated from the CPU circuit 6 and produces the video signal corresponding to the image data.

On the basis of the contents of display command signals outputted from the CPU circuit 6, the image switching interface circuit 8 does select one of the video signals: the video signal outputted from the graphic interface circuit 7; the video signals outputted from the TV tuner unit, the video unit, the navigation system, etc.; the video signal outputted from the rear camera unit, and successively supplies the so-selected video signal to the TV monitoring unit 3, as a so-called "display signal".

In the main control unit 2, when the driver or the like manipulates the remote control unit to select one of the TV broadcasting programs, the playback picture of the video unit, the guidance picture for the navigation system, the pick-up picture brought by the rear camera unit and the contents caught by the VICS receiving apparatus, then the CPU circuit 6 controls to allow the image switching interface circuit 8 to select the video signal corresponding to the contents selected through the remote control unit and successively supplies the so-selected video signal to the TV monitoring unit 3, as the display signal. In this way, the contents of the display signal are outputted on the TV monitoring unit 3.

Under the above condition, if the gear shifting lever is manipulated to occupy the reverse position, the vehicle is brought into the abnormal condition, or if the emergency information is received by the VICS receiving apparatus, then the CPU circuit 6 produces the display command signal for selecting the video signal of rear view, the display picture about the emergency information, or the display picture of the abnormalities, in order to control the image switching interface circuit 8. In this way, the backward view, the contents of the emergency information, the contents of the vehicle's abnormality, etc. can be displayed on the TV monitoring unit 3.

Repeatedly, on the basis of the operation contents by the remote control unit, the vehicle speed and the engine speed obtained by the information system for vehicle's condition, the REV signal representing the gear shifting lever in the reverse position, the PKB signal representing the parking brake in the activated condition, the VICS signal from the VICS receiving apparatus, etc., the most suitable video signal (or the most suitable display contents) is selected out of various video signals: the video signals generated from the TV tuner unit, the video unit, the navigation system, etc.; the video signal outputted from the rear camera unit and various display contents: the display contents representing the abnormality of the vehicle; the display contents of the VICS signal outputted from the VICS receiving apparatus, etc. Accordingly, it is possible to automatically select the most suitable picture from a plurality of pictures, in response to the operation contents of the remote control unit and the vehicle's condition and also possible to display the selected picture on the TV monitoring unit 3. Thus, it is possible to improve the working efficiency of the expensive monitoring unit 3 remarkably.

In addition, according to the embodiment, if the vehicle has any abnormal event or if any emergency information is brought by any traffic information system, for example the "VICS" system, then the contents of such an emergency information can be immediately displayed on the TV monitoring unit 3 although the vehicle monitoring system has just displayed the other picture on the TV monitoring unit 3. In other words, according to the embodiment, it is possible to improve the safety during the vehicle's traveling remarkably.

2nd. Embodiment

We now describe the vehicle monitoring system in accordance with the second embodiment of the present invention. Note, since the constitution of the vehicle monitoring system of the second embodiment is identical to that of the above-mentioned system of FIG. 3, an illustration of the system is eliminated.

A difference between the second embodiment and the first embodiment resides in that, on modification of the program in the CPU circuit 6, the present vehicle monitoring system has a function of checking whether the video signal is being outputted from the rear camera unit. That is, even if the conditions for displaying the picture picked up by the rear camera unit are completed so as to allow the TV monitoring unit 3 to display the above picture essentially, the system is adapted so as to keep on displaying the contents of original video signal on condition that no video signal is generated from the rear camera unit.

Next, we describe an operation of the system of the second embodiment, with reference to a flow chart of FIG. 4.

First of all, at step ST1, it is judged whether or not the remote control unit is manipulated by the driver, or the like. If the judgment at step ST1 is Yes, the routine goes to step ST2 where it is further judged whether any one of various video signals and display contents (i.e., the video signal from the video unit; the video signal from the navigation system; the video signal representing the program contents in the TV broadcasting; the display contents showing the abnormality of the vehicle; the display contents received by the VICS receiving apparatus) is selected. On the selection of the video signal ("Yes" at step ST2), the video signal corresponding to the selected contents by means of the remote control unit is selected by the CPU circuit 6 of the main control unit 2 to produce the command signal for display and also the image data required for displaying, such as the video data expressing the abnormality in the vehicle, the image data representing the contents of the VICS signal, etc. Then, the so-produced image data is converted to the video signal by the graphic interface circuit 7.

Next, among the video signal from the video unit, the video signal from the navigation system, the video signal of the TV broadcasting, the contents showing the abnormal in the vehicle and the VICS display contents, the video signal or the display contents designated by the display switching signal is selected by the image switching interface circuit 8 to produce the display signal. Then, the display signal is supplied to the TV monitoring unit 3, so that the picture corresponding to the display signal is displayed on the TV monitoring unit 3 at steps ST3–ST6.

At next step ST7, it is judged whether the vehicle has the abnormal event in terms of the engine speed, the vehicle speed, or the like, which are detected by the vehicle's condition information system or judged whether the emergency information is generated from the VICS receiving apparatus. When the judgment at step ST7 is Yes, then the CPU circuit 6 produces the display command signal required for displaying the emergency information and subsequently, the image switching interface circuit 8 selects the video signal designated by the above display command signal, out of the respective video signals outputted from the graphic interface circuit 7. In this way, at next step ST8, the contents of the emergency information are displayed on the TV monitoring unit 3 and then, the routine goes to step ST9. Note, when the judgment at step ST7 is No, the routine also goes to step ST9 while skipping step ST8.

At step ST9, it is judged whether or not the REV signal is inputted. When the gear shifting lever is operated so as to occupy the reverse position, then the CPU circuit 6 produces the display command signal required for selecting the video signal from the rear camera unit. Simultaneously, by the image switching interface circuit 8, it is also judged whether or not the video signal is being outputted from the rear camera unit. When the video signal is outputted from the rear camera unit, that is, Yes at step ST 9, then the routine goes to step ST10 to store a sort of the image signal which has been outputted before the display command signal required for selecting the video signal of the rear camera unit is supplied. At next step ST11, it is executed to select the video signal from the rear camera unit and supply the selected signal as the display signal to the TV monitoring unit 3 for displaying the rear view.

On the other hand, when the judgment at step ST9 is No, that is, when the video signal is not outputted from the rear camera unit on the grounds that it is not energized yet or no camera unit is mounted on the vehicle, then the routine goes to step ST12 where the image switching interface circuit 8 selects the video signal before the display command signal required for selecting the video signal of the rear camera unit is supplied. Consequently, the TV monitoring unit 3 keeps on displaying the picture corresponding to the selected video signal.

As mentioned above, since the vehicle monitoring system of the embodiment is operated so as to keep on displaying the picture which has been displayed before the gear shifting lever is shifted to the reverse position when the video signal is not generated from the rear camera by the above-mentioned reasons, it is possible to prevent the picture on the TV monitoring unit 3 from disappearing even when the vehicle moves back under condition that it is not equipped with the rear camera unit.

Consequently, even after the vehicle previously equipped, on the factory's side, with the main control unit 2 and the TV monitoring unit 3 has been delivered to the user, it is possible to allow the TV monitoring unit 3 to display the rear view if only installing the rear camera unit on the vehicle on the user's side, whereby the applicability of the system can be improved.

Note, in common with the above-mentioned embodiments, although the prohibition of displaying the specified video signal is withdrawn irrespective of the vehicle's traveling condition or its standstill condition, the system may be constructed in a manner that displaying the pictures from the TV broadcasting program or the video unit is forbidden in order to ensure the driver's safety when the vehicle is at the traveling condition.

In addition, although a single video signal (or a single display contents) is selected by the main control unit 2 and displayed on the TV monitoring unit 3 in common with the above-mentioned embodiments, it is also applicable to select two or more video signals and/or display contents and display the combined pictures in the form of various displaying patterns, for example, the two-pictures displaying form, the parent-child displaying form, the composite displaying form, etc.

Thus, with the large displaying capacity of the TV display monitoring unit 3, it is possible to output much information on display of the single TV monitoring unit 3.

Furthermore, it is possible to provide the vehicle monitoring system with a plurality of TV monitoring units allowing the same picture or different pictures to be outputted simultaneously or switched optionally. For example, the different TV monitoring units 3 may be arranged in the vicinity of the driver's seat and the rear seat of a wagon-type vehicle, respectively. In such a case, it is more preferable that the TV monitoring unit 3 on the side of the driver's seat does only display the information necessary for the vehicle's traveling, while the other TV monitoring unit 3 on the side of the rear seat does display the pictures of the TV broadcasting program, the video player, etc. Note, in such a case, the TV monitoring units may be manipulated by a single remote control unit collectively. Alternatively, they may be manipulated by different remote control units, respectively.

With the above-mentioned constitution, it is possible to provide a more useful vehicle monitoring system.

What is claimed is:

1. A vehicle monitoring system for a vehicle, comprising:
   at least one sensor attached to a part of the vehicle for determining at least one driving condition of the vehicle;
   a monitoring unit mounted on the vehicle for displaying information about the vehicle;
   a display determining section for determining what kind of picture to be displayed based on inputted command signals and the driving condition detected by the sensor; and
   a display processing section for selecting at least one video signal out of a plurality of inputted signals based on the kind of picture determined to be displayed by the display determining section, producing a display signal corresponding to the selected at least one video signal with or without image-processing thereof, and allowing the monitoring unit to display the contents of the selected at least one video signal.

2. A vehicle monitoring system as claimed in claim 1, wherein when emergency information is inputted to the vehicle monitoring system the display determining section gives the emergency information priority over any other video signals and the display processing section allows the monitoring unit to display the contents of the emergency information thereon.

3. A vehicle monitoring system as claimed in claim 1, wherein when the vehicle moves in a rearward direction the display determining section determines whether or not a rear video signal representing a rear view of the vehicle is being inputted, and when the rear video signal is inputted, the display determining section determines that the rear video signal is an object that is being displayed;

when the rear video signal is not inputted, the display determining section determines that the selected at least one video signal is the object that is being displayed.

4. A vehicle monitoring system as claimed in claim 1, wherein the the command signals are inputted by a remote control unit installed on the vehicle.

5. A vehicle monitoring system as claimed in claim 1, wherein the driving condition includes a speed of the vehicle.

6. A vehicle monitoring system as claimed in claim 1, wherein the driving condition is represented by a signal indicating an engine speed of the vehicle.

7. A vehicle monitoring system as claimed in claim 1, wherein the driving condition is represented by a REV signal indicating that a gear shifting lever occupies a reverse position for allowing the vehicle to move in a rearward direction.

8. A vehicle monitoring system as claimed in claim 1, wherein the driving condition is represented by a PKB signal indicating whether a parking brake of the vehicle is activated.

9. A vehicle monitoring system as claimed in claim 1, further comprising a VICS receiving apparatus, wherein the display determining section determines what kind of picture should be displayed based on the inputted command signals, the driving condition detected by the sensor, and a VICS signal from the VICS receiving apparatus.

10. A vehicle monitoring system as claimed in claim 1, wherein the monitoring unit displays the contents of the at least one video signal selected by the display processing section to at least one passenger of the vehicle.

11. A vehicle monitoring system as claimed in claim 10, wherein the vehicle is operated by a driver and the monitoring unit displays the contents of the at least one video signal selected by the display processing section to the driver.

12. A vehicle monitoring system as claimed in claim 11, wherein the monitoring unit displays the contents of the at least one video signal selected by the display processing section while the vehicle is in operation.

13. A vehicle monitoring system as claimed in claim 1, wherein the monitoring unit displays the contents of the at least one video signal selected by the display processing section while the driving condition is occurring.

14. A vehicle monitoring system as claimed in claim 13, wherein the monitoring unit displays the contents of the at least one video signal selected by the display processing section to at least one passenger of the vehicle.

15. A vehicle monitoring system as claimed in claim 1, wherein when the at least one sensor senses an emergency driving condition the display determining section determines that a picture representing the emergency driving condition is to be displayed and the display processing section selects a emergency video signal out of a plurality of inputted, non-emergency signals to be displayed and allows the monitoring unit to display the picture representing the emergency driving condition.

16. A vehicle monitoring system as claimed in claim 15, wherein the monitoring unit displays the picture representing the emergency driving condition to at least one passenger of the vehicle while the emergency driving condition is occurring.

17. A vehicle monitoring system for a vehicle, comprising:

at least one sensor attached to a part of the vehicle for determining at least one driving condition of the vehicle;

a monitoring unit mounted on the vehicle for displaying information about the vehicle;

an input device for receiving display command signals;

a display determining section for determining what kind of picture to be displayed based on the display command signals received by the input device and the driving condition detected by the sensor; and a display processing section for selecting at least one video signal out of a plurality of inputted signals based on the kind of picture determined to be displayed by the display determining section, producing a display signal corresponding to the selected at least one video signal with or without image-processing thereof, and allowing the monitoring unit to display the contents of the selected at least one video signal to at least one passenger of the vehicle while the vehicle is in operation.

18. A vehicle monitoring system as claimed in claim 17, wherein when the at least one sensor senses an emergency driving condition the display determining section determines that a picture representing the emergency driving condition is to be displayed and the display processing section selects an emergency video signal out of a plurality of inputted, non-emergency signals and allows the monitoring unit to display the picture representing the emergency driving condition.

19. A vehicle monitoring system as claimed in claim 18, wherein the monitoring unit displays the picture representing the emergency driving condition while the emergency driving condition is occurring.

20. A vehicle monitoring system as claimed in claim 17, wherein when the vehicle moves in a rearward direction the display determining section determines whether or not a rear video signal representing a rear view of the vehicle is being inputted, and when the rear video signal is inputted, the display determining section determines that the rear video signal is an object that is being displayed;

when the rear video signal is not inputted, the display determining section determines that the selected at least one video signal is the object that is being displayed.

21. A vehicle monitoring system as claimed in claim 17, wherein the driving condition is represented by at least one of a first signal indicating a speed of the vehicle, a second signal indicating an engine speed of the vehicle, a third signal indicating whether a gear shifting lever occupies a reverse position for allowing the vehicle to move in a rearward direction, and a fourth signal indicating whether a parking brake of the vehicle is activated.

* * * * *